(12) United States Patent
Nagai et al.

(10) Patent No.: US 10,619,578 B2
(45) Date of Patent: Apr. 14, 2020

(54) LINK MECHANISM ACTUATOR FOR INTERNAL COMBUSTION ENGINE

(71) Applicant: HITACHI AUTOMOTIVE SYSTEMS, LTD., Hitachinaka-shi, Ibaraki (JP)

(72) Inventors: Kishiro Nagai, Atsugi (JP); Yoshihiro Suda, Hitachinaka (JP); Junichiro Onigata, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/079,484

(22) PCT Filed: Feb. 7, 2017

(86) PCT No.: PCT/JP2017/004335
§ 371 (c)(1),
(2) Date: Aug. 23, 2018

(87) PCT Pub. No.: WO2017/145736
PCT Pub. Date: Aug. 31, 2017

(65) Prior Publication Data
US 2019/0072044 A1 Mar. 7, 2019

(30) Foreign Application Priority Data

Feb. 24, 2016 (JP) .................. 2016-032614

(51) Int. Cl.
*F02D 15/02* (2006.01)
*F02B 75/04* (2006.01)
(Continued)

(52) U.S. Cl.
CPC .............. *F02D 15/02* (2013.01); *F02B 75/04* (2013.01); *F02B 75/048* (2013.01); *F02B 75/32* (2013.01);
(Continued)

(58) Field of Classification Search
CPC ...... F02D 15/02; F02D 15/00; F02D 2700/03; F02B 75/048; F02B 75/047; F16H 49/001; F16H 21/32
See application file for complete search history.

(56) References Cited

U.S. PATENT DOCUMENTS 3,128,641 A 4/1964 Museer
3,187,862 A 6/1965 Musser
(Continued)

FOREIGN PATENT DOCUMENTS

JP 2012251446 A * 12/2012 ............. F02D 15/02
JP 2015-145646 A 8/2015
(Continued)

*Primary Examiner* — Long T Tran
(74) *Attorney, Agent, or Firm* — Foley & Lardner LLP

(57) ABSTRACT

Provided is an actuator for a link mechanism for an internal combustion engine, which is capable of enhancing the durability of a wave gear type speed reducer or a bearing portion. The actuator for a link mechanism for an internal combustion engine according to the present invention includes: a housing including a bearing portion configured to support a control shaft so that the control shaft is rotatable; and the wave gear type speed reducer configured to reduce a rotation speed of an output shaft connected to a drive motor, and to transmit the reduced rotation speed to the control shaft. A restricting mechanism is provided to one of the control shaft and the housing, and is configured to restrict movement of the control shaft toward the wave gear type speed reducer side in an axial direction by being brought into contact with another of the control shaft and the housing.

14 Claims, 6 Drawing Sheets

(51) Int. Cl.
*F02B 75/32* (2006.01)
*F16H 21/10* (2006.01)
*F16H 1/32* (2006.01)
*F16H 49/00* (2006.01)

(52) U.S. Cl.
CPC ............... *F16H 1/32* (2013.01); *F16H 21/10* (2013.01); *F16H 49/001* (2013.01)

(56) References Cited

U.S. PATENT DOCUMENTS

| | | | | |
|---|---|---|---|---|
| 2008/0283008 | A1* | 11/2008 | Hiyoshi | ................ F02B 75/048 123/90.17 |
| 2014/0290625 | A1* | 10/2014 | Hiyoshi | ................... F02B 75/32 123/48 R |
| 2015/0219009 | A1* | 8/2015 | Onigata | ................... F02D 15/02 74/586 |
| 2015/0219022 | A1* | 8/2015 | Nagai | ................... F02B 75/045 123/48 B |
| 2015/0354448 | A1* | 12/2015 | Hiyoshi | ................ F02B 75/047 123/48 B |
| 2015/0377120 | A1* | 12/2015 | Hiyoshi | ................... F02D 15/02 123/48 B |

FOREIGN PATENT DOCUMENTS

| | | | |
|---|---|---|---|
| JP | 2015-145647 | A | 8/2015 |
| JP | 2017-032070 | A | 2/2017 |

\* cited by examiner

LINK MECHANISM ACTUATOR FOR INTERNAL COMBUSTION ENGINE

TECHNICAL FIELD

The present invention relates to an actuator for, for example, a link mechanism to be used for a variable valve mechanism configured to variably change operating characteristics of an engine valve of an internal combustion engine, or a link mechanism to be used for a variable compression ratio mechanism configured to variably change a mechanical actual compression ratio of the internal combustion engine.

BACKGROUND ART

Hitherto, a technology disclosed in Patent Literature 1 has been known as a variable compression ratio mechanism. According to Patent Literature 1, a multi-link type piston and crank mechanism are used to change stroke characteristics of a piston so that a mechanical compression ratio of an internal combustion engine can be changed. Specifically, the piston and a crankshaft are coupled to each other through intermediation of an upper link and a lower link. A posture of the lower link is controlled by turning of a control shaft connected to an actuator including a drive motor, and a wave gear type speed reducer. With this configuration, the stroke characteristics of the piston are changed to control the engine compression ratio. Further, bearings are provided on both sides of the wave gear type speed reducer in an axial direction, and with those bearings, the wave gear type speed reducer is rotatably supported.

CITATION LIST

Patent Literature

PTL 1: JP 2015-145646 A

SUMMARY OF INVENTION

Technical Problem

However, in the technology described in Patent Literature 1, both the sides of the wave gear type speed reducer in the axial direction are supported by the bearings, and hence torque input or reverse torque input to the wave gear type speed reducer causes torsion in the wave gear type speed reducer, and a load in a thrust direction is generated in the control shaft. In such a case, there is a problem in that, due to the thrust load that acts on the wave gear type speed reducer side, the durability of the wave gear type speed reducer is degraded, and further, that the durability of the bearings supporting the wave gear type speed reducer is degraded.

The present invention has been made in view of the problem described above, and has an object to provide an actuator for a link mechanism for an internal combustion engine, which is capable of enhancing the durability of a wave gear type speed reducer or a bearing portion.

Solution to Problem

In order to achieve the object described above, according to one embodiment of the present invention, an actuator for a link mechanism for an internal combustion engine includes: a housing including a bearing portion configured to rotatably support a control shaft; and a wave gear type speed reducer configured to reduce a rotation speed of an output shaft connected to a drive motor, and to transmit the reduced rotation speed to the control shaft, and a restricting mechanism configured to restrict movement of the control shaft toward the wave gear type speed reducer side in the axial direction by bringing one of the control shaft and the housing into contact with another of the control shaft and the housing is provided.

Advantageous Effects of Invention

With the above configuration, the durability of a wave gear type speed reducer or a bearing portion can be enhanced.

DESCRIPTION OF EMBODIMENTS

First Embodiment

Figure 1:
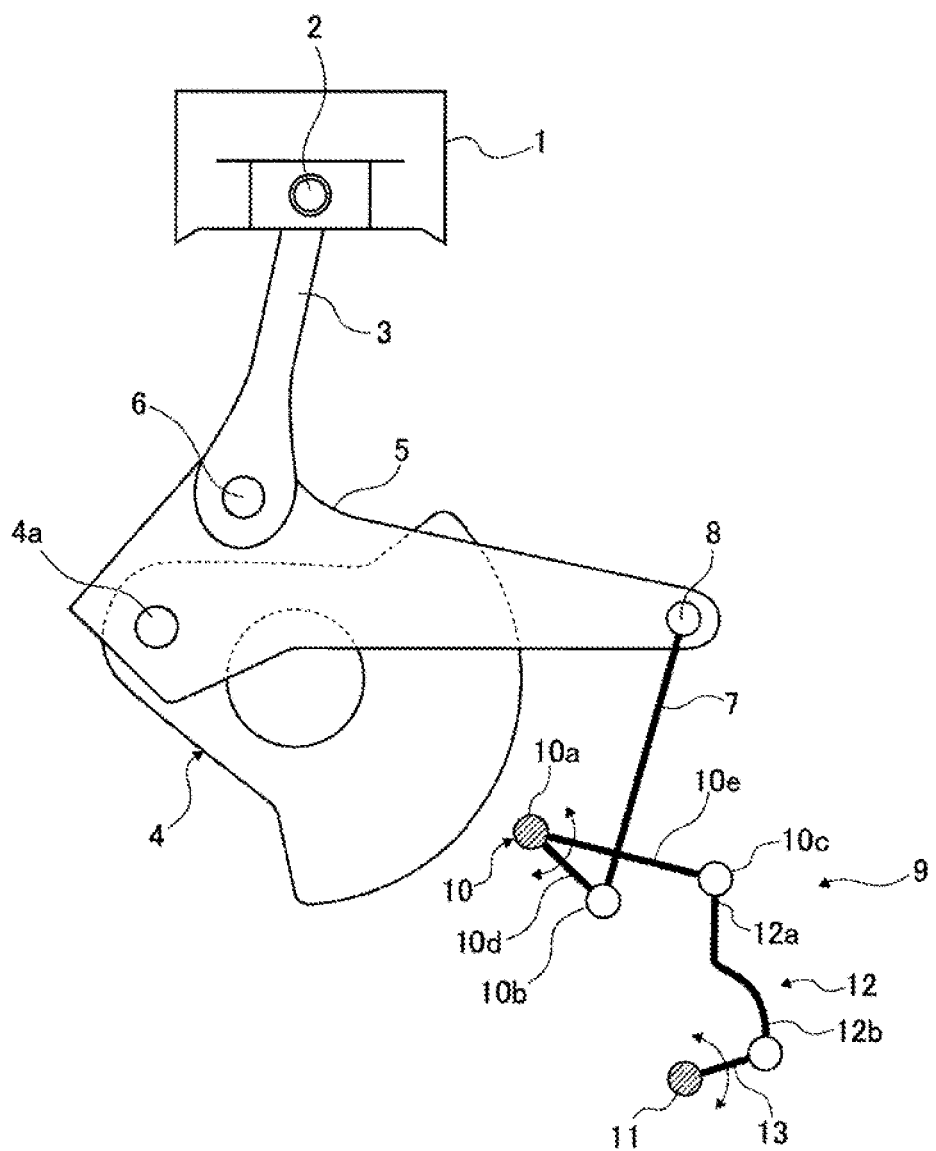
FIG. 1 is a schematic view of an internal combustion engine including an actuator for a link mechanism for an internal combustion engine according to the present invention.
Figure 2:
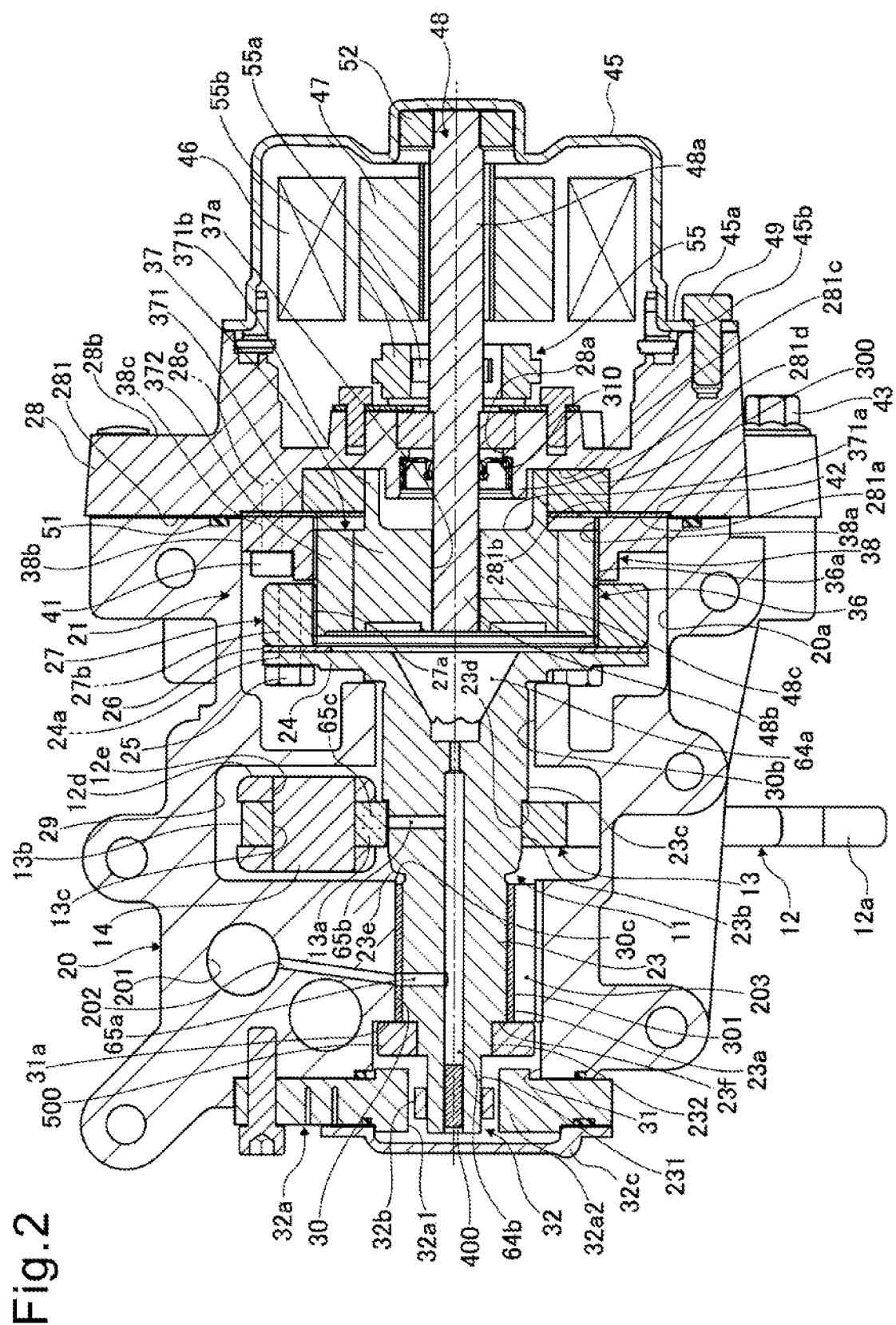
FIG. 2 is a sectional view of an actuator for a link mechanism for an internal combustion engine according to a first embodiment of the present invention.
Figure 3:
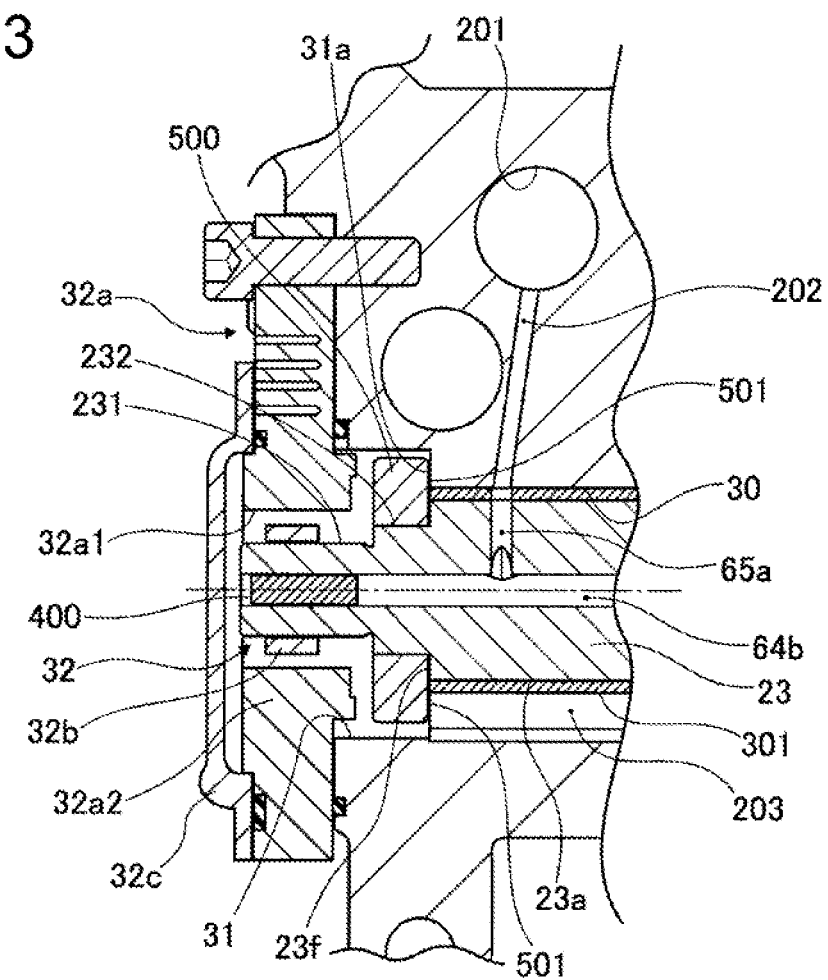
FIG. 3 is a partially enlarged sectional view of the actuator for a link mechanism for an internal combustion engine according to the first embodiment.

FIG. 1 is a schematic view of an internal combustion engine including an actuator for a link mechanism for an internal combustion engine according to one embodiment of the present invention. FIG. 2 is a sectional view of the actuator for a link mechanism for an internal combustion engine according to the first embodiment. FIG. 3 is a partially enlarged sectional view of the actuator for a link mechanism for an internal combustion engine according to the first embodiment. A basic configuration is the same as that illustrated in FIG. 1 of JP 2011-169152 A, and therefore is briefly described. An upper end of an upper link 3 is rotatably coupled to a piston 1, which moves in a reciprocating manner inside a cylinder of a cylinder block of an internal combustion engine, through intermediation of a piston pin 2. A lower link 5 is rotatably coupled to a lower end of the upper link 3 through intermediation of a coupling pin 6. A crankshaft 4 is rotatably coupled to the lower link 5 through intermediation of a crank pin 4a. Further, an upper end portion of a first control link 7 is rotatably coupled to the lower link 5 through intermediation of a coupling pin 8. A lower end portion of the first control link 7 is coupled to a coupling mechanism 9 including a plurality of link members. The coupling mechanism 9 includes a first control shaft 10, a second control shaft 11, and a second control link 12 configured to couple the first control shaft 10 and the second control shaft 11 to each other.

The first control shaft 10 is provided so as to extend in parallel to the crankshaft 4 provided so as to extend in a cylinder bank direction inside the internal combustion engine. The first control shaft 10 includes a first journal portion 10a rotatably supported on an internal combustion engine main body, a control eccentric shaft portion 10b to which the lower end portion of the first control link 7 is rotatably coupled, and an eccentric shaft portion 10c to which one end portion 12a of the second control link 12 is rotatably coupled. A first arm portion 10d has one end that is coupled to the first journal portion 10a and another end that is coupled to the lower end portion of the first control link 7. The control eccentric shaft portion 10b is provided at a position deviated by a predetermined amount with respect to the first journal portion 10a. A second arm portion 10e has one end that is coupled to the first journal portion 10a and another end that is coupled to the one end portion 12a of the second control link 12. The eccentric shaft portion 10c is provided at a position deviated by a predetermined amount with respect to the first journal portion 10a. One end of an arm link 13 is rotatably coupled to another end portion 12b of the second control link 12. The second control shaft 11 is coupled to another end of the arm link 13. The arm link 13 and the second control shaft 11 are not moved relative to each other. The second control shaft 11 is rotatably supported in a housing 20 described later through intermediation of a plurality of journal portions.

The second control link 12 has a lever-like shape. The one end portion 12a coupled to the eccentric shaft portion 10c is formed approximately linearly. Meanwhile, the other end portion 12b to which the arm link 13 is coupled is formed in a curved fashion. An insertion hole 12c through which the eccentric shaft portion 10c is inserted so as to be turnable is formed through a distal end portion of the one end portion 12a. The other end portion 12b has distal end portions 12d formed into a bifurcated shape. A coupling hole 12e is formed through the distal end portion 12d. A coupling hole 13c having a diameter approximately equal to that of the coupling hole 12e is formed through a projecting portion 13b of the arm link 13. The projecting portion 13b of the arm link 13 is sandwiched between the distal end portions 12d formed into the bifurcated shape. In this state, a coupling pin 14 passes through the coupling holes 12e and 13c to be press-fitted and fixed.

The arm link 13 is formed as a body separately from the second control shaft 11. The arm link 13 is a member having a large thickness, which is made of an iron-based metal material. The arm link 13 includes an annular portion having a press-fit hole 13a formed in an approximate center to pass therethrough and a projecting portion 13b having a U-shape which projects to an outer periphery. A fixing portion 23b formed between the journal portions of the second control shaft 11 is press-fitted into the press-fit hole 13a. Through the press-fitting of the fixing portion 23b, the second control shaft 11 and the arm link 13 are fixed. In the projecting portion 13b, there is formed a coupling hole 13c in which the coupling pin 14 is supported so as to be turnable. An axial center of the coupling hole 13c (axial center of the coupling pin 14) is deviated from an axial center of the second control shaft 11 by a predetermined amount in a radial direction.

A rotational position of the second control shaft 11 is changed by a torque transmitted from a drive motor 22 through intermediation of a wave gear type speed reducer 21 being a part of actuator for a link mechanism for an internal combustion engine. When the rotational position of the second control shaft 11 is changed, the first control shaft 10 is rotated through intermediation of the second control link 12 to change a position of the lower end portion of the first control link 7. In this manner, a posture of the lower link 5 is changed to change a stroke position or a stroke amount of the piston 1 inside the cylinder.

Along with the change, an engine compression ratio is changed.

(Configuration of Actuator for Link Mechanism for Internal Combustion Engine)

As illustrated in FIG. 2, the actuator for a link mechanism for an internal combustion engine includes the drive motor 22, the wave gear type speed reducer 21 mounted to a distal end side of the drive motor 22, a housing 20 in which the wave gear type speed reducer 21 is accommodated, and the second control shaft 11 rotatably supported in the housing 20.

(Configuration of Drive Motor)

The drive motor 22 is a brushless motor, and includes a motor casing 45 having a bottomed cylindrical shape, a coil 46 having a tube-like shape fixed onto an inner peripheral surface of the motor casing 45, a rotor 47 rotatably provided inside the coil 46, a motor drive shaft 48 having one end portion 48a fixed in a center of the rotor 47, and a resolver 55 configured to detect an angle of rotation of the motor drive shaft 48. The motor drive shaft 48 is rotatably supported by a ball bearing 52 provided to a bottom portion of the motor casing 45. The motor casing 45 includes four boss portions 45a formed on an outer periphery of a front end. A bolt insertion hole 45b through which a bolt 49 is inserted is formed through each of the boss portions 45a.

The resolver 55 includes a resolver rotor 55a and a sensor portion 55b. The resolver rotor 55a is press-fitted over and fixed to an outer periphery of the motor drive shaft 48. The sensor portion 55b is configured to detect a plurality of teeth-shaped targets formed on an outer peripheral surface of the resolver rotor 55a. The resolver 55 is provided at a position so as to project through an opening of the motor casing 45. The sensor portion 55b is fixed inside a cover 28 with two screws and outputs a detection signal to a control unit (not shown). When the motor casing 45 is mounted to the cover 28, the bolts 49 are inserted into the boss portions 45a while a seal member such as an O-ring is provided between an end surface of the resolver 55 and the cover 28. Then, the bolts 49 are fastened to male thread portions formed on the cover 28 on a side closer to the drive motor 22. Thus, the motor casing 45 is fixed to the cover 28. A motor accommodating chamber configured to accommodate the drive motor 22 with the motor casing 45 and the cover 28 is constructed as a dry room into which lubricating oil or the like is not fed.

(Configuration of Second Control Shaft)

The second control shaft 11 includes a shaft portion main body 23 provided so as to extend in an axial direction and a fixing flange 24 radially expanded from the shaft portion main body 23. The second control shaft 11 includes the shaft portion main body 23 and the fixing flange 24 formed integrally of an iron-based metal material. The shaft portion main body 23 has a level-difference shape in the axial direction, and includes a sensor shaft portion 231 and a retainer shaft portion 232 (see FIG. 3 and FIG. 4). The sensor shaft portion 231 is located on an inner periphery of an angle sensor 32. The retainer shaft portion 232 has a diameter larger than the sensor shaft portion 231. A retainer 500, which is a restricting member configured to restrict movement of the second control shaft 11 toward the wave gear type speed reducer side in the axial direction, is press-fitted and fixed to the retainer shaft portion 232. On an outer periphery of the sensor shaft portion 231, a rotor 32b that functions as a component of the angle sensor 32 is provided (see FIG. 3 and FIG. 4). Further, the second control shaft 11 includes a first journal portion 23a, a fixing portion 23b, and a second journal portion 23c. The first journal portion 23a is located on the wave gear type speed reducer side with respect to the retainer shaft portion 232, and has a small diameter on a distal end portion side. The fixing portion 23b has a medium diameter, and is press-fitted into the press-fit hole 13a of the arm link 13 from the first journal portion 23a side. The second journal portion 23c has a large diameter on the fixing flange 24 side. Further, a first level-difference portion 23d is formed between the fixing portion 23b and the second journal portion 23c. Further, a second level-difference portion 23e is formed between the first journal portion 23a and the fixing portion 23b. Further, a third level-difference portion 23f is formed between the first journal portion 23a and the retainer shaft portion 232. The third level-difference portion 23f serves as a stopper when the retainer 500 is press-fitted into the retainer shaft portion 232, and hence the retainer 500 can easily be press-fitted.

When the press-fit hole 13a of the arm link 13 is press-fitted over the fixing portion 23b from the first journal portion 23a side, one end portion of the press-fit hole 13a on a side closer to the second journal portion 23c is brought into abutment against the first level-difference portion 23d in the axial direction. With this configuration, movement of the arm link 13 toward the second journal portion 23c is restricted. Meanwhile, when the shaft portion main body 23 is inserted through a bearing 301 having been press-fitted in a support hole 30 formed in the housing 20, the second level-difference portion 23e is brought into abutment against a level-difference hole edge portion 30c of the support hole 30 and the bearing 301 to restrict movement of the second control shaft 1 in the axial direction toward a side opposite to the wave gear type speed reducer 21 side. The shaft portion main body 23 is rotatable inside a first bearing hole 301a of the bearing 301, and is supported so that slight axial movement is allowed. In other words, a slight clearance is secured between an inner periphery of the first bearing hole 301a and the shaft portion main body 23.

Six bolt insertion holes 24a are formed equiangularly in an outer peripheral portion of the fixing flange 24. Six bolts 25 are inserted into the bolt insertion holes 24a so that the fixing flange 24 is joined to a wave gear output shaft member 27 corresponding to inner teeth of the wave gear type speed reducer 21 through intermediation of a thrust plate 26 therebetween.

In the second control shaft 11, there is provided an introduction portion (not shown) configured to introduce lubricating oil pressure-fed from an oil pump. The introduction portion is formed in a center of the fixing flange 24, and includes an oil chamber 64a and an axial oil passage 64b. The oil chamber 64a has a conical shape to which the lubricating oil is fed through the axial oil passage 64b to be described later. The axial oil passage 64b is formed from the oil chamber 64a along an axial center direction of the second control shaft. The lubricating oil fed to the oil chamber 64a is fed to the wave gear type speed reducer 21 described later. In the second control shaft 11, there are formed a plurality of radial oil passages 65a and 65b being in communication to the axial oil passage 64b.

On an end portion of the axial oil passage 64b on a side opposite to the oil chamber 64a, a sealing member 400 configured to close the axial oil passage 64b is provided (see FIG. 3). In the radial direction of the bearing 301, there is provided a bearing portion lubricating oil feed oil passage 302, which communicates to the second lubricating oil feed oil passage 202 described later, and is opened at a position of facing the radial oil passage 65a of the second control shaft 11. A radially outer side of the radial oil passage 65a is open toward a clearance between an outer peripheral surface of the first journal portion 23a and the first bearing hole 301a, and the radial oil passage 65a feeds the lubricating oil to the first journal portion 23a. Further, a groove having a width approximately equal to that of the radial oil passage 65a is formed at an outer periphery of the axial position at which the radial oil passage 65a is formed, and the lubricating oil fed to the outer periphery of the first journal portion 23a is guided from the entire periphery to flow into the radial oil passage 65a, and is fed to the axial oil passage 64b. The radial oil passage 65b is held in communication to an oil hole 65c formed inside the arm link 13 and feeds the lubricating oil between an inner peripheral surface of the coupling hole 13c and an outer peripheral surface of the coupling pin 14 through the oil hole 65c.

(Configuration of Housing)

The housing 20 is made of an aluminum alloy material to have an approximately cubic shape. An opening groove portion 20a having a large-diameter annular shape is formed on a rear end side of the housing 20. The opening groove portion 20a is closed with the cover 28 through intermediation of an O-ring 51 therebetween. The cover 28 has a motor-shaft through hole 28a and four boss portions 28b. The motor-shaft through hole 28a is formed in a center position, through which the motor-shaft through hole 28a extends. The four boss portions 28b are radially expanded to a radially outer peripheral side. The cover 28 and the housing 20 are fastened and fixed by inserting bolts 43 through bolt through holes formed through the boss portions 28b.

On a side surface perpendicular to an opening direction of the opening groove portion 20a, there is formed an opening for the second control link 12 coupled to the arm link 13. On an inner side of the housing 20 in which the opening is formed, there is formed an accommodation chamber 29 serving as a working region for the arm link 13 and the second control link 12. Between the opening groove portion 20a and the accommodation chamber 29, there is formed a speed-reducer side through hole 30b through which the second journal portion 23c of the second control shaft 11 extends. A support hole 30 through which the first journal portion 23a of the second control shaft 11 extends is formed in an axial side surface of the accommodation chamber 29.

At an end portion of the support hole 30 on the angle sensor 32 side, a retainer receiving hole 31 having a diameter larger than the opening of the support hole 30 is formed. Between the opening of the support hole 30 on the angle sensor 32 side and the retainer receiving hole 31, there is formed a level-difference surface 31a formed in a direction substantially orthogonal to the second control shaft 11. The retainer 500 is held in abutment against the level-difference surface 31a, to thereby restrict movement of the second control shaft 11 toward the wave gear type speed reducer side in the axial direction. Inside the housing 20, there are provided a first lubricating oil feed oil passage 201 for introducing lubricating oil pressure-fed from an oil pump (not shown), and a second lubricating oil feed oil passage 202. The first lubricating oil feed oil passage 201 extends in the direction substantially orthogonal to the second control shaft 11. Further, the second lubricating oil feed oil passage 202 connects the first lubricating oil feed oil passage 201 and the support hole 30. At a portion below the retainer receiving hole 31, there is provided a lubricating oil reflux oil passage 203, which is in communication to the retainer receiving hole 31, and is configured to reflux the lubricating oil to the accommodation chamber 29 side.

(Configuration of Angle Sensor)

The angle sensor 32 includes a sensor holder 32a mounted so as to close the retainer receiving hole 31 from the outside of the housing 20. The sensor holder 32a includes a through hole 32a1, in which a detection coil 32a2 is arranged in an inner peripheral portion thereof, and a flange portion 32a2 for fixing the sensor holder 32a to the housing 20 with bolts. A seal ring is provided between the sensor holder 32a and the housing 20 to ensure the liquid sealing performance between the retainer receiving hole 31 and the outside. Further, on an outer peripheral side of the sensor holder 32a, a sensor cover 32c configured to close the through hole 32a1 is provided. A seal ring is provided between the sensor cover 32c and the sensor holder 32a to ensure the liquid sealing performance between the retainer receiving hole 31 or the through hole 32a1 and the outside.

Figure 4:
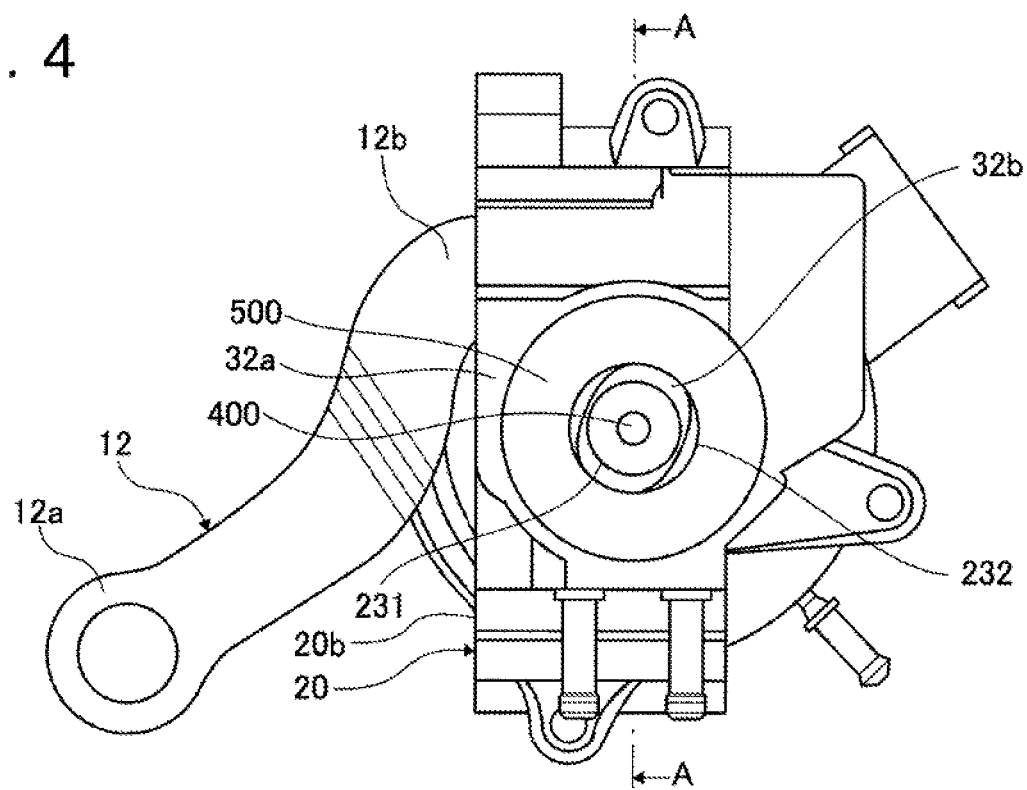
FIG. 4 is a schematic view for illustrating a relationship of respective components in the vicinity of a rotor in the first embodiment.

Inside the through hole 32a1, the sensor shaft portion 231 to which the rotor 32b is mounted to an outer periphery thereof is inserted. FIG. 4 is a view in which the sensor holder 32a of the first embodiment is removed as viewed in the axial direction. As illustrated in FIG. 4, the rotor 32b is a component having a substantially ellipsoidal shape. The angle sensor 32 is configured to detect that a distance set between an inner periphery of the through hole 32a1 and the rotor 32b is changed through rotation of the rotor 32b by change in inductance of the detection coil. With this, a rotation position of the rotor 32b, that is, a rotation angle of the second control shaft 11 is detected. As described above, the angle sensor 32 is a so-called resolver sensor, and outputs rotation angle information to a control unit (not shown) configured to detect an engine operating state.

(Configuration of Wave Gear Type Speed Reducer)

Figure 5:
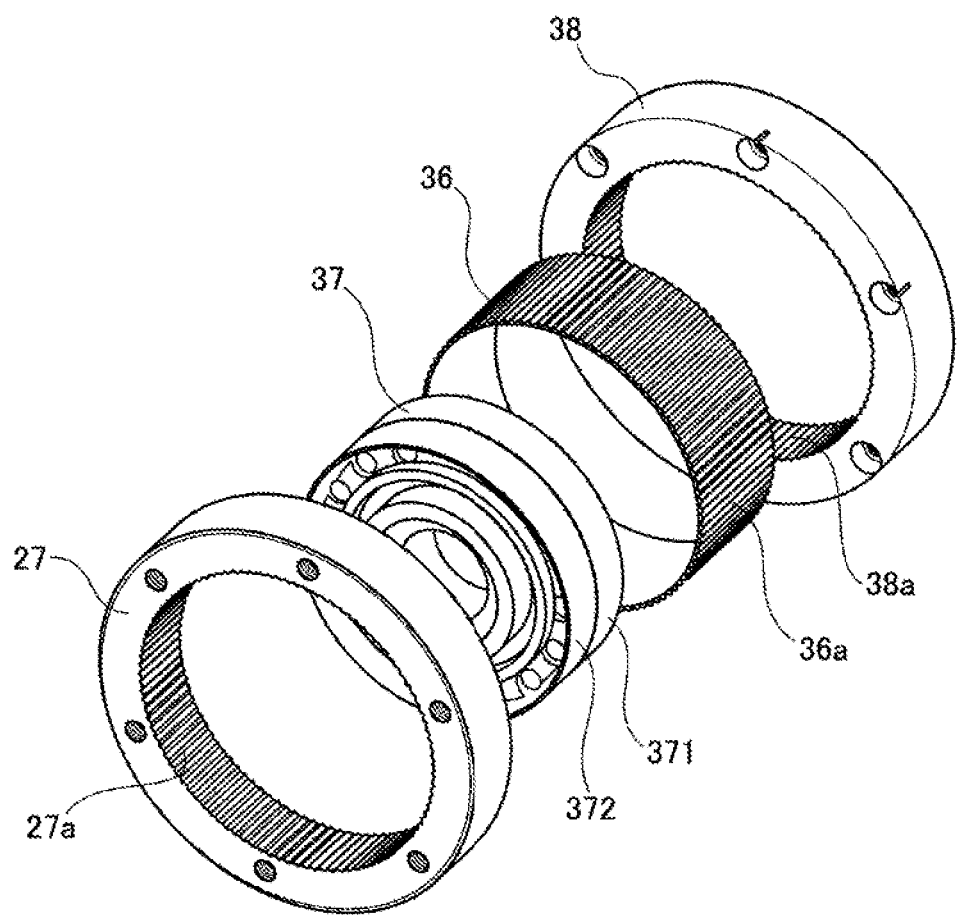
FIG. 5 is an exploded perspective view of a wave gear type speed reducer in the first embodiment.

FIG. 5 is an exploded perspective view of the wave gear type speed reducer in the first embodiment. The wave gear type speed reducer 21 is of harmonic drive (registered trademark) type and includes components accommodated in the opening groove portion 20a of the housing 20 closed with the cover 28. The wave gear type speed reducer 21 includes the first wave gear output shaft member 27, a flexible outer gear 36, a wave generating device 37, and a second wave gear fixing shaft member 38. The first wave gear output shaft member 27 has an annular shape, is fixed to the fixing flange 24 of the second control shaft 11 with bolts, and has a plurality of inner teeth 27a formed on an inner periphery thereof. The flexible outer gear 36 is arranged on the radially inner side with respect to the first wave gear output shaft member 27, is flexurally deformable, and has outer teeth 36a formed on an outer peripheral surface thereof, which are meshed with the inner teeth 27a. This phenomenon is caused in the following manner. Specifically, the flexible outer gear 36 is provided so as to be flexurally deformable, and hence an input from the wave generating device or a reverse input through the arm link 13 from the engine side to the wave gear output shaft member 27 causes torsional deformation of the flexible outer gear 36. Due to the torsion, the outer teeth 36a of the flexible outer gear 36 are deformed obliquely with respect to the axial direction, and the second control shaft 11 coupled to the wave gear output shaft member 27 fitted to the outer teeth 36a is moved in the thrust direction. The wave generating device 37 is formed into an ellipsoidal shape, and an outer peripheral surface thereof is slidable along an inner peripheral surface of the flexible outer gear 36. The second wave gear fixing shaft member 38 is arranged on the radially outer side with respect to the flexible outer gear 36, and has inner teeth 38a formed on an inner peripheral surface thereof, which are meshed with the outer teeth 36a.

On an outer peripheral side of the first wave gear output shaft member 27, there are formed male thread holes 27b being nut portions respectively for the bolts 25 at equiangular positions. The flexible outer gear 36 is made of a metal material, and is a flexurally deformable cylindrical member having a small thickness. The number of the outer teeth 36a of the flexible outer gear 36 is the same as the number of the inner teeth 27a of the first wave gear output shaft member 27.

The wave generator 37 includes a main body portion 371 and ball bearings 372. The main body portion 371 has an ellipsoidal shape. The ball bearings 372 are configured to allow relative rotation between an outer periphery of the main body portion 371 and an inner periphery of the flexible outer gear 36. In a center of the main body portion 371, a through hole 37a is formed. Serration is formed on an inner periphery of the through hole 37a, and is coupled through serration coupling to serration formed on an outer periphery of another end portion 48b of the motor drive shaft 48. The serrations may be coupled using a key groove or through spline coupling, and the method of coupling is not particularly limited. A cylindrical portion 371b extended toward the drive motor so as to surround an outer periphery of the through hole 37a is formed on a drive-motor-side side surface 371a of the main body portion 371. A sectional shape of the cylindrical portion 371b is a perfect circle. A diameter of an outer periphery of the cylindrical portion 371b is set to be smaller than a short diameter of the main body portion 371.

A flange 38b to be fastened to the cover 28 is formed on an outer periphery of the second wave gear fixing shaft member 38. Six bolt through holes 38c are formed through the flange 38b. A second thrust plate 42 is provided between the second wave gear fixing shaft member 38 and the cover 28. Then, bolts 41 are inserted into the bolt through holes 38c to fasten and fix the second wave gear fixing shaft member 38 and the second thrust plate 42 to the cover 28. The second thrust plate 42 is made of an iron-based metal material having a wear resistance equal to or higher than that of the flexible outer gear 36. In this manner, the cover 28 is prevented from being worn by a thrust force generated in the flexible outer gear 36, and an axial position of a ball bearing 300 described later is restricted. The number of the inner teeth 38a of the second wave gear fixing shaft member 38 is larger than the number of the outer teeth 36a of the flexible outer gear 36 by two. Thus, the number of the inner teeth 38a of the second wave gear fixing shaft member 38 is larger than the number of the inner teeth 27a of the first wave gear output shaft member 27 by two. In a wave gear type speed reducing mechanism, a speed reduction ratio is determined based on a difference between the numbers of teeth. Thus, an extremely large speed reduction ratio is obtained.

(Support Structure for Rotary Member)

On an end surface 281 of the cover 28 on a side closer to the wave gear type speed reducer 21, there are formed a female thread portion 28c, a plate accommodating portion 281a, a bearing accommodating portion 281b, and a seal accommodating portion 281d. The bolt 41 is threadedly engaged with the female thread portion 28c. The plate accommodating portion 281a has a depth approximately equal to a thickness of the second thrust plate 42 and is configured to accommodate the second thrust plate 42 therein. The bearing accommodating portion 281b is a level-difference portion having a bottomed cylindrical shape formed to be bent from the plate accommodating portion 281a toward the drive motor 22. The seal accommodating portion 281d has a cylindrical shape and is provided at a radially inner position of a bottom surface 281c of the bearing accommodating portion 281b so as to extend in the axial direction toward the wave generator side. The above-mentioned motor shaft through hole 28a is formed further on the radially inner side of the seal accommodating portion 281d.

In the bearing accommodating portion 281b, the open-type ball bearing 300 is accommodated. The ball bearing 300 is a rolling bearing of a four point contact type which can receive a load in a thrust direction. An axial thickness of the ball bearing 300 is approximately equal to an axial depth of the bearing accommodating portion 281b. Further, an outer diameter of the ball bearing 300 is set larger than an outer diameter of a ball bearing 52 so as to sufficiently ensure a bearing capacity. The outer ring of the ball bearing 300 is accommodated in the bearing accommodating portion 281b. An end surface of the outer ring of the ball bearing 300 on a side closer to the wave gear type speed reducer 21 is held in abutment against the second thrust plate 42, whereas an end surface of the outer ring of the ball bearing 300 on a side closer to the drive motor 22 is held in abutment against the bottom surface 281c. Thereby a position of the outer ring of the ball bearing 300 in both of a direction toward the wave gear type speed reducer 21 and a direction toward the drive motor 22 in an axial direction of the ball bearing 300 is restricted. Further, the bearing accommodating portion 281b is provided on a side of the wave generator 37, which is closer to the drive motor 22. Specifically, the ball bearing 300 is supported at a position closer to the drive motor 22, thereby suppressing deformation of the motor drive shaft 48 so as to suppress an increase in axial size toward the second control shaft 11.

An outer diameter of the outer ring of the bearing 300 is set larger than an inner diameter of the first wave gear output shaft member 27 and an inner diameter of the second wave gear fixing shaft member 38. Further, an inner diameter of the outer ring of the ball bearing 300 is smaller than an inner diameter of the flexible outer gear 36. An inner periphery of the inner ring of the ball bearing 300 is fixed (press-fitted) over an outer peripheral side of the cylindrical portion 371b provided so as to extend from the main body portion 371 of the wave generator 37. The fixation herein is not limited to the press-fit, and may also include, for example, fixation through restriction of an axial position with a level difference and a snap ring. In this manner, the motor drive shaft 48 is supported by the ball bearing 52 provided between the motor drive shaft 48 and the motor casing 45, and is also supported by the ball bearing 300 through intermediation of the main body portion 371 and the cylindrical portion 371b.

The second control shaft 11 is supported at the first journal portion 23a and the second journal portion 23c so as to be rotatable relative to the housing 20. An alternating load is input to the second control shaft 11l from a main motor system of the internal combustion engine. Therefore, in order to rotate the second control shaft 11 against the alternating load, reduction in speed by the wave gear type speed reducer 21 is required. However, the wave gear type speed reducer 21 generates a load in the axial direction at the time of reducing the speed, and hence the load in the axial direction acts also on the second control shaft 11. Further, a load in the axial direction generated due to tilt of the arm link 13 acts. This phenomenon is caused in the following manner. Specifically, the flexible outer gear 36 is provided so as to be flexurally deformable, and hence an input from the wave generating device 37 or a reverse input through the arm link 13 from the engine side to the wave gear output shaft member 27 causes torsional deformation of the flexible outer gear 36. Due to the torsion, the outer teeth 36a of the flexible outer gear 36 are deformed obliquely with respect to the axial direction, and the second control shaft 11 coupled to the wave gear output shaft member 27 fitted to the outer teeth 36a is moved in the thrust direction. At this time, when the second control shaft 11 is excessively moved in the axial direction, an unnecessary load acts on the wave gear type speed reducer 21, and thus there is a fear of causing degradation in durability. In view of this, the retainer 500 including a restricting surface 501 oriented toward the wave gear type speed reducer side in the axial direction is provided on the second control shaft 11, and the level-difference surface 31a held in abutment against the restricting surface 501 is formed on the housing 20. With this configuration, there is obtained a restricting mechanism for restricting the second control shaft 11 from excessively moving toward the wave gear type speed reducer side.

(Configuration of Sealing Portion)

On a radially inner side of the cylindrical portion 371b, there is formed the seal accommodating portion 281d having a diameter smaller than that of an inner peripheral surface of the cylindrical portion 371b. A seal member 310 configured to seal between the opening groove portion 20a, which is configured to accommodate the wave gear type speed reducer 21 therein, and the drive motor 22 in a liquid tight fashion is provided between an inner periphery of the seal accommodating portion 281d and the outer periphery of the motor drive shaft 48. The seal accommodating portion 281d is provided so as to extend on the radially inner side of the cylindrical portion 371b. In other words, the seal accommodating portion 281d is formed so as to overlap the cylindrical portion 371b and the ball bearing 300 as viewed in the radial direction.

(Feeding of Lubricating Oil)

The lubricating oil fed from the first lubricating oil feed oil passage 201 flows to the axial oil passage 64b via the second lubricating oil feed oil passage 202, the bearing portion lubricating oil feed oil passage 302, and the radial oil passage 65a. At this time, when the lubricating oil flows from the bearing portion lubricating oil feed oil passage 302 to the radial oil passage 65a, the lubricating oil is fed also to a clearance between the first journal portion 23a of the second control shaft 11 and an inner periphery of the bearing 301. The lubricating oil fed to the clearance flows to the arm link 13 side and also to the angle sensor 32 side. The lubricating oil fed between the side surface of the retainer 500 and the level-difference surface 31a is refluxed from the lubricating oil reflux oil passage 203 provided at a lower part of FIG. 2 to the accommodation chamber 29 side.

At this time, when the lubricating oil is actively fed to the angle sensor 32 side, the amount of the lubricating oil fed to the axial oil passage 64b is reduced, and thus, there is a fear in that the wave gear type speed reducer 21 cannot be sufficiently lubricated. Further, when the high-temperature lubricating oil flowing through the engine is scattered to the angle sensor 32, there is a fear of causing degradation in durability of the angle sensor 32. In view of this, in the first embodiment, the sealing member 400 configured to seal an end portion of the axial oil passage 64b is provided, and the retainer 500 having a substantially disc-like shape, which is configured to block an end portion of the second control shaft 11 on the angle sensor 32 side, is provided. With this, the lubricating oil is not excessively fed to the clearance between the outer periphery of the shaft portion main body 23 and the inner periphery of the bearing 301, and thus, the amount of the lubricating oil fed to the axial oil passage 64b can be secured. Further, with the retainer 500, scattering of the lubricating oil to the angle sensor 32 is prevented, and the lubricating oil flowing out through a clearance between the retainer 500 and the level-difference surface 31a is captured to the outer periphery of the retainer 500 and flows downward. Therefore, scattering of the lubricating oil to the angle sensor 32 can be prevented, thereby being capable of preventing degradation in durability of the angle sensor 32.

Further, the restricting surface 501 being the side surface of the retainer 500 on the second control shaft 11 side, the level-difference surface 31a, and the end portion of the bearing 301 on the angle sensor 32 side are arranged apart from each other. In other words, a slight clearance is secured between the restricting surface 501 and the level-difference surface 31a. The clearance is eliminated when the second control shaft 11 is moved toward the wave gear type speed reducer 21 side in the axial direction, and the clearance is secured when the second level-difference portion 23e is held in abutment against the level-difference hole edge portion 30c.

That is, the second control shaft 11 is made of an iron-based metal material, whereas the housing 20 is made of an aluminum alloy material. As coefficients of linear expansion of the second control shaft 11 and the housing 20 are different from each other, when the temperature of the actuator is increased, and when the housing 20 is expanded more than the second control shaft 11, a friction between the second control shaft 11 and the housing 20 is increased, and there is a fear of causing degradation in fuel efficiency. However, with the clearance, abutment between the second level-difference portion 23e and the level-difference hole edge portion 30c, and abutment between the restricting surface 501 of the retainer 500 and the level-difference surface 31a can be prevented, thereby being capable of preventing increase in friction. Further, when the second control shaft 11 is moved toward the wave gear type speed reducer 21 side in the axial direction, the retainer 500 and the level-difference surface 31a are held in abutment against each other so that excessive movement of the second control shaft 11 can be restricted.

Effects of First Embodiment

Effects produced by the actuator for a link mechanism for an internal combustion engine described in the first embodiment are now listed below.

(1) An actuator for a link mechanism for an internal combustion engine includes: a second control shaft 11, which is to be coupled to the link mechanism for an internal combustion engine, and is configured to change a posture of the link mechanism through rotation; a housing 20 including a bearing portion configured to support the second control shaft 11 so that the second control shaft 11 is rotatable; a drive motor 22 configured to rotationally drive a motor drive shaft 48 and a wave generator 37 (output shaft); a wave gear type speed reducer 21 configured to reduce a rotation speed of the motor drive shaft 48, and to transmit the reduced rotation speed to the second control shaft 11; and a retainer 500 (restricting mechanism), which is provided to the second control shaft 11, and is configured to restrict movement of the second control shaft 11 toward the wave gear type speed reducer side in the axial direction by being brought into contact with another of the housing 20.

Therefore, the durability of the bearing portion or the wave gear type speed reducer 21 can be enhanced. In the first embodiment, the retainer 500 is provided on the second control shaft 11 side. However, the retainer 500 may be set on the housing 20 side, to thereby restrict movement of the second control shaft 11 in the axial direction.

(2) The second control shaft 11 includes an arm link 13 (arm) to be coupled to the link mechanism. The housing 20 has an accommodation chamber 29 (recessed portion) that is capable of accommodating the arm link 13. The bearing portion includes: a support hole 30 (first bearing portion) provided on another end side in a rotation axis direction of the second control shaft 11 with respect to the accommodation chamber 29 of the housing; and a speed-reducer side through hole 30b (second bearing portion) provided on one end side in the rotation axis direction of the second control shaft 11 with respect to the accommodation chamber 29. The retainer 500 is provided on an angle sensor 32 side being the other end side in the rotation axis direction of the second control shaft 11 with respect to the support hole 30.

The accommodation chamber 29 has a complicated shape, and hence it is difficult to be additionally processed. On the contrary, the retainer 500 is arranged on the angle sensor 32 side being another end side in the rotation axis direction of the second control shaft 11, and thus, the restricting mechanism can be formed by simple processing.

(3) The housing 20 has a retainer receiving hole 31 (opening) that is opened on the other end side in the rotation axis direction of the second control shaft 11 with respect to the first journal portion 23a. The housing 20 further includes a sensor holder 32a (cover) configured to close the retainer receiving hole 31. The retainer 500 is provided in the retainer receiving hole 31.

Therefore, after the second control shaft 11 is inserted into the housing 20 and is assembled thereto, the retainer 500 can be assembled. Thus, ease of manufacture can be secured as compared to a case in which the restricting mechanism is formed in the accommodation chamber 29.

(4) The second control shaft 11 includes a rotor 32b (detected portion) on the other end side in the axial direction of the second control shaft 11 with respect to the retainer 500. The housing 20 includes a sensor holder 32a (detecting portion) configured to detect a rotation angle of the rotor 32b. The retainer 500 is separated from the rotor 32b.

Therefore, even when vibration or the like caused by abnormal input of knocking or the like from the arm link 13 or the like is input, with the structure in which the abnormal input is less easily transmitted to the rotor 32b side, deviation of a sensor detection value by the angle sensor 32 and degradation in detection accuracy can be prevented.

(5) The housing 20 includes: a bearing portion lubricating oil feed oil passage 302 (bearing feed oil passage) configured to communicate between the first journal portion 23a and an oil passage of the internal combustion engine; and a sensor chamber in which the rotor 32b is arranged. The retainer 500 is opposed to the angle sensor 32 side of the support hole 30 in the axial direction.

Therefore, with the retainer 500, scattering of the lubricating oil to the angle sensor 32 can be prevented, and thus, an adverse influence on the sensor can be prevented.

(6) The retainer 500 includes: an annular member press-fitted to an outer periphery of the second control shaft 11; and a level-difference surface 31a (opposing surface) formed on the housing 20 so as to be opposed to the support hole 30 side of the retainer 500 in the axial direction.

Therefore, the restricting mechanism can be formed by only additionally providing the member to the second control shaft 11, and forming the surface held in abutment against the housing side, and hence manufacturing cost is low.

(7) The second control shaft 11 includes: a first journal portion 23a (journal portion axially supported to the first bearing portion); a retainer shaft portion 232 (medium-diameter portion) being formed on another end side of the first journal portion 23a in the axial direction and having a diameter smaller than a diameter of the first journal portion 23a; and a sensor shaft portion 231 (small-diameter portion) being formed on another end side of the retainer shaft portion 232 in the axial direction and having a diameter smaller than a diameter of the retainer shaft portion 232. The retainer 500 being an annular member is press-fitted to the retainer shaft portion 232, and a rotor 32b is fixed to the sensor shaft portion 231.

Therefore, when the retainer 500 is to be press-fitted, the step differences due to the differences in diameter can function as the stoppers, and thus, the retainer 500 can be easily press-fitted.

(8) The second control shaft 11 has an axial oil passage 64b (inner hole) extended in the axial direction. The actuator includes a sealing member 400 configured to seal an angle sensor 32 of the axial oil passage 64b in the axial direction.

Therefore, scattering of the lubricating oil to the angle sensor 32 can be prevented while the amount of the lubricating oil to the wave gear type speed reducer 21 side is secured.

(9) The sealing member 400 is press-fitted on the angle sensor 32 side (another end side) in the rotation axis direction of the second control shaft 11 with respect to the first journal portion 23a.

Therefore, deformation or the like caused by the press-fitting can be prevented from adversely influencing the accuracy of the first journal portion 23a.

(10) The second control shaft 11 includes a rotor 32b on the angle sensor 32 side in the axial direction of the second control shaft 11 with respect to the retainer 500. The housing 20 includes a sensor holder 32a configured to detect a rotation angle of the rotor 32b. The sealing member 400 is formed into a cylindrical shape, and is press-fitted to an inside of the axial oil passage 64b of the sensor shaft portion 231 being an inner periphery side of the rotor 32b.

Therefore, scattering of the lubricating oil to the angle sensor 32 can be prevented.

Second Embodiment

Figure 6:
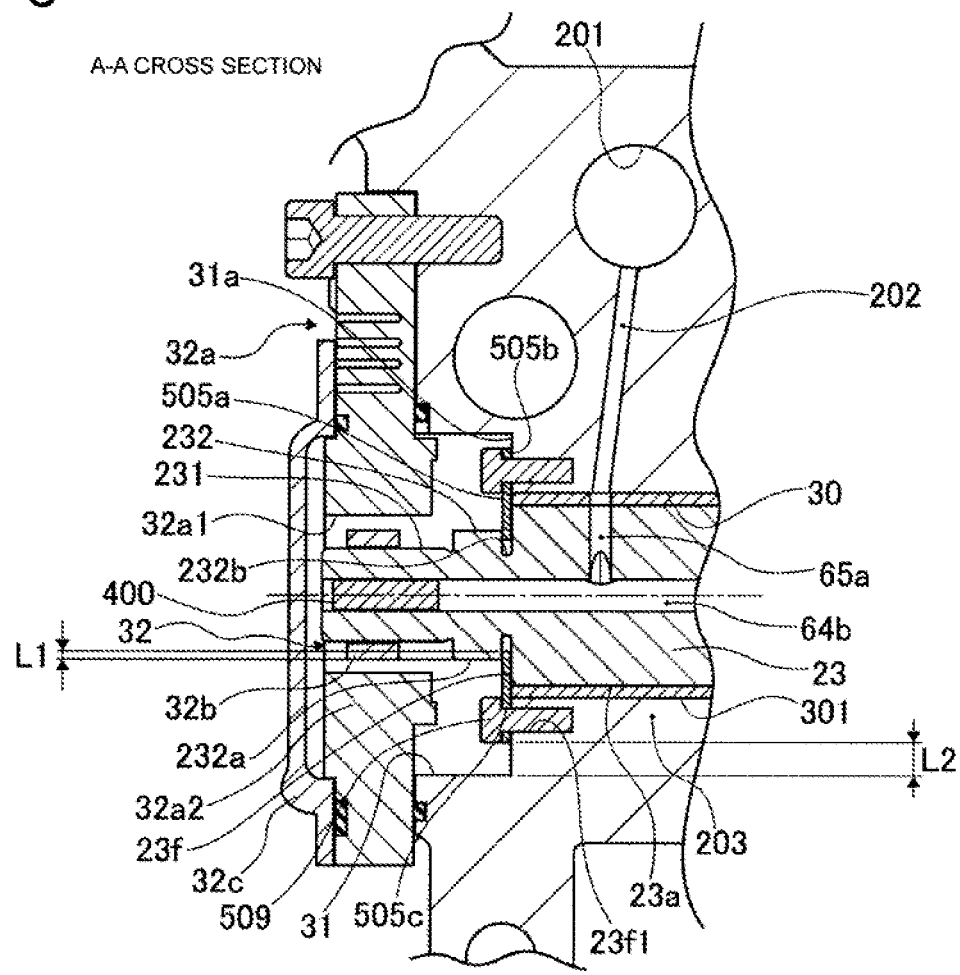
FIG. 6 is a partially enlarged sectional view of an actuator for a link mechanism for an internal combustion engine according to a second embodiment of the present invention, which is taken along the line A-A.
Figure 7:
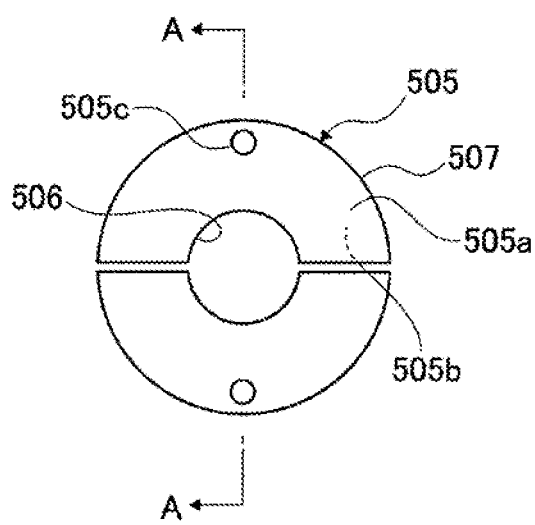
FIG. 7 is a front view for illustrating a retaining plate in the second embodiment.

Next, a second embodiment of the present invention is described. A basic configuration is the same as that of the first embodiment, and therefore only differences are described. FIG. 6 is a partially enlarged sectional view of an actuator for a link mechanism for an internal combustion engine according to the second embodiment of the present invention, which is taken along the line A-A. FIG. 7 is a front view for illustrating a retaining plate in the second embodiment. In the configuration of the first embodiment, as the restricting mechanism, the retainer 500 is press-fitted and fixed to the second control shaft 11, and the retainer 500 is held in abutment against the level-difference surface 31a formed on the housing 20. On the contrary, in a configuration of the second embodiment, a retaining plate 505 is provided on the housing 20, and the retaining plate 505 is engaged with a locking groove 232b formed in the second control shaft 11.

The locking groove 232b is formed on the radially inner side with respect to an outer periphery of the retainer shaft portion 232 in the third level-difference portion 23f between the retainer shaft portion 232 and the first journal portion 23a. The retainer shaft portion 232 has an oblong shape in cross section. The locking groove 232b is not formed in the small-diameter portion of the retainer shaft portion 232. The locking groove 232b is formed so that a bottom portion of the locking groove 232b matches with the small-diameter portion as approaching the large-diameter portion from the small-diameter portion.

The retaining plate 505 is formed by a pair of semicircular plates obtained by dividing a plate member having an annular shape in half. The retaining plate 505 includes inner peripheral edges 506, outer peripheral edges 507, first side surfaces 505a opposed to the angle sensor 32 side, second side surfaces 505b opposed to the wave gear type speed reducer 21 side, and bolt holes 505c through which the fixing bolts 509 pass. In the level-difference surface 31a of the housing 20, female thread portions 23f1 with which the fixing bolts 509 are meshed are formed at two positions. The retaining plate 505 is fixed to the level-difference surface 31a of the housing 20 with the fixing bolts 509. In the retaining plate 505 fixed to the housing 20, the inner peripheral edge 506 enters the locking groove 232b by a predetermined amount L1, to thereby restrict axial movement of the second control shaft 11 toward the wave gear type speed reducer 21 side.

The retainer receiving hole 31 in the second embodiment is an elongate hole shape obtained by combining a circle about the axial center of the second control shaft 11 and a circle offset from the axial center in a predetermined direction. An inner periphery of the retainer receiving hole 31, which is the farthest part from the axial center of the second control shaft 11, has a clearance L2 from the outer peripheral edge 507 of the retaining plate 505. The clearance L2 is secured to be larger than the amount L1. Therefore, after the second control shaft 11 is assembled to the housing 20, one plate of the retaining plate 505 being the semicircular plate is assembled to the retainer receiving hole 31. At this time, the one plate of the retaining plate 505 is inserted from a portion having the clearance L2, and is held in abutment against the third level-difference portion 23f. Then, the one plate of the retaining plate 505 is fitted in the locking groove 232b. Under this state, the one plate of the retaining plate 505 is rotated by 180°, and is fixed with the fixing bolt 509. Next, another plate of the retaining plate 505 is inserted, and is fitted in the locking groove 232b. Then, another plate of the retaining plate 505 is fixed with the fixing bolt 509. With this, the restricting mechanism for restricting the second control shaft 11 can be provided while the retainer receiving hole 31 is formed to have a minimized size.

As described above, the following functions and effects are obtained in the second embodiment.

(11) The restricting mechanism includes: a locking groove 232b (restricting surface) formed on an outer periphery of the second control shaft 11 and oriented toward the one end side in the rotation axis direction of the second control shaft 11; and a retaining plate 505 (abutment member) formed on the housing 20 and held in abutment against the locking groove 232b.

Therefore, the position, at which the second control shaft 11 is locked, can be closely arranged to the angle sensor 32. Accordingly, even when a difference in coefficient of linear expansion occurs along with the temperature increase, an adverse influence on the detection accuracy of the angle sensor 32 can be prevented.

(12) The locking groove 232b is a side surface on the other end side in the axial direction of the second control shaft 11 in an annular groove formed in the outer periphery of the second control shaft 11. The retaining plate 505 is a plate-like member engageable with the locking groove 23b being an annular groove and is fixed to the housing 20.

Therefore, movement of the second control shaft 11 toward both the axial sides in the axial direction can be restricted.

(13) The retaining plate 505 is fixed to the retainer receiving hole 31 being an opening of the housing 20 with fixing bolts 509.

Therefore, after the second control shaft 11 is assembled to the housing 20, the restricting mechanism can be formed easily.

Other Embodiments

Although the description has been given above based on each of the embodiments, another configuration may be employed without being limited to the embodiments described above. For example, although the actuator for a link mechanism for an internal combustion engine is employed for the mechanism configured to variably change the compression ratio of the internal combustion engine in the first embodiment, the actuator may be employed for a link mechanism for a variable valve timing mechanism configured to variably change actuation timing of an intake valve or an exhaust valve.

Further, in the first embodiment, the retainer 500 being the restricting member is formed separately from the second control shaft 11, but may be formed integrally with the second control shaft 11. Further, in the second embodiment, the retaining plate 505 is formed separately from the housing 20. However, the housing 20 may be divided, and a portion corresponding to the retaining plate 505 may be formed integrally with the housing 20.

Technical ideas obtained from the embodiments described above are listed below.

In one mode, there is provided an actuator for a link mechanism for an internal combustion engine including: a control shaft, which is to be coupled to the link mechanism for an internal combustion engine, and is configured to change a posture of the link mechanism through rotation; a housing including a bearing portion configured to support the control shaft so that the control shaft is rotatable; a drive motor configured to rotationally drive an output shaft; a wave gear type speed reducer configured to reduce a rotation speed of the output motor, and to transmit the reduced rotation speed to the control shaft; and a restricting mechanism, which is provided to one of the control shaft and the housing, and is configured to restrict movement of the control shaft toward the wave gear type speed reducer side in the axial direction by being brought into contact with the control shaft or another of the control shaft and the housing.

In a further preferred mode, in the above-mentioned mode, the control shaft includes an arm to be coupled to the link mechanism. The housing has a recessed portion that is capable of accommodating the arm. The bearing portion includes: a first bearing portion provided on another end side in a rotation axis direction of the control shaft with respect to the recessed portion of the housing; and a second bearing portion provided on one end side in the rotation axis direction of the control shaft with respect to the recessed portion. The restricting mechanism is provided on the other end side in the rotation axis direction of the control shaft with respect to the first bearing portion.

In still another preferred mode, in any of the above-mentioned modes, the housing has an opening that is opened on the other end side in the rotation axis direction of the control shaft with respect to the first bearing portion. The housing further includes a cover configured to close the opening. The restricting mechanism is provided in the opening.

In still another preferred mode, in any of the above-mentioned modes, the control shaft includes a detected portion on the other end side in the axial direction of the control shaft with respect to the restricting mechanism. The housing includes a detecting portion configured to detect a rotation angle of the detected portion. The restricting mechanism is separated from the detected portion.

In still another preferred mode, in any of the above-mentioned modes, the housing includes: a bearing feed oil passage configured to communicate between the bearing portion and an oil passage of the internal combustion engine; and a sensor chamber in which the detected portion is arranged. The restricting mechanism is opposed to the detecting portion side of the bearing portion in the axial direction.

In still another preferred mode, in any of the above-mentioned modes, the restricting mechanism includes: an annular member press-fitted to an outer periphery of the control shaft; and an opposing surface formed on the housing so as to be opposed to the bearing side of the annular member in the axial direction.

In still another preferred mode, in any of the above-mentioned modes, the control shaft includes: a journal portion axially supported to the first bearing portion; a medium-diameter portion being formed on another end side of the journal portion in the axial direction and having a diameter smaller than a diameter of the journal portion; and a small-diameter portion being formed on another end side of the medium-diameter portion in the axial direction and having a diameter smaller than a diameter of the medium-diameter portion. The annular member is press-fitted to the medium-diameter portion, and a detected portion is fixed to the small-diameter portion.

In still another preferred mode, in any of the above-mentioned modes, the control shaft has an inner hole extended in the axial direction, and the actuator includes a sealing member configured to seal a detecting portion side of the inner hole in the axial direction.

In still another preferred mode, in any of the above-mentioned modes, the sealing member is press-fitted on the other end side in the rotation axis direction of the control shaft with respect to the journal portion.

In still another preferred mode, in any of the above-mentioned modes, the control shaft includes a detected portion on the other end side in the axial direction of the control shaft with respect to the restricting mechanism. The housing includes a detecting portion configured to detect a rotation angle of the detected portion. The sealing member is formed into a cylindrical shape, and is press-fitted to an inner periphery side of the detected portion.

In still another preferred mode, in any of the above-mentioned modes, the restricting mechanism includes: a restricting surface formed on an outer periphery of the control shaft and oriented toward the one end side in the rotation axis direction of the control shaft; and an abutment member formed on the housing and held in abutment against the restricting surface.

In still another preferred mode, in any of the above-mentioned modes, the restricting surface is a side surface on the other end side in the axial direction of the control shaft in an annular groove formed in the outer periphery of the control shaft. The abutment member is a plate-like member engageable with the annular groove and is fixed to the housing.

In still another preferred mode, in any of the above-mentioned modes, the abutment member is fixed to an opening of the housing with bolts.

Further, in another aspect, in one mode, there is provided an actuator for a link mechanism for an internal combustion engine including: a control shaft, which is to be coupled to the link mechanism configured to variably change a compression ratio of an internal combustion engine, and is configured to change the compression ratio of an internal combustion engine by changing a posture of the link mechanism through rotation; a housing including a bearing portion configured to support the control shaft so that the control shaft is rotatable; a drive motor configured to rotationally drive an output shaft; a wave gear type speed reducer configured to reduce a rotation speed of the output motor, and to transmit the reduced rotation speed to one end side of the control shaft; and a restricting mechanism provided between the control shaft and the housing, and is configured to restrict movement of the control shaft toward the wave gear type speed reducer side in the axial direction.

In the above-mentioned mode, it is preferred that the control shaft include a detected portion on the other end side in the axial direction of the control shaft with respect to the bearing portion, that the housing include a detecting portion configured to detect a rotation angle of the detected portion, and that the restricting mechanism be separated from the detected portion.

In the above-mentioned mode, it is further preferred that the housing include: a bearing feed oil passage configured to communicate between the bearing portion and an oil passage of the internal combustion engine; and a sensor chamber in which the detected portion is arranged, and that the restricting mechanism is opposed to the detecting portion side of the bearing portion in the axial direction.

Description has been given of only some embodiments of the present invention, but it is readily understood by a person skilled in the art that various changes and improvements can be made to the exemplified embodiments without practically departing from the novel teachings and advantages of the present invention. Thus, forms to which such changes and improvements are made are also intended to be included in the technical scope of the present invention.

The present application claims a priority based on Japanese Patent Application No. 2016-032614 filed on Feb. 24, 2016. All disclosed contents including Specification, Scope of Claims, Drawings, and Abstract of Japanese Patent Application No. 2016-032614 filed on Feb. 24, 2016 are incorporated herein by reference in their entirety.

All disclosed contents including Specification, Scope of Claims, Drawings, and Abstract of Japanese Patent Application No. 2015-145646 (Patent Literature 1) are incorporated herein by reference in their entirety.

REFERENCE SIGNS LIST 7 control link
9 coupling mechanism
10 first control shaft
11 second control shaft
12 second control link
13 arm link
20 housing
20a opening groove portion
21 wave gear type speed reducer
22 drive motor
23 shaft portion main body
23a first journal portion
23c second journal portion
23d first level-difference portion
23e second level-difference portion
24b level-difference portion
26 thrust plate
27 first wave gear output shaft member
27a inner teeth
28 cover
28a motor shaft through hole
29 accommodation chamber
30 support hole
30a bearing hole
30b speed-reducer side through hole
30c level-difference hole edge portion
31 retainer receiving hole
31a level-difference surface
32 angle sensor
32a sensor holder
32a2 detection coil
32b rotor
45 motor casing
48 motor drive shaft
64b axial oil passage
400 sealing member
500 retainer
501 restricting surface
505 retaining plate

The invention claimed is:

1. An actuator for a link mechanism for an internal combustion engine, the actuator comprising:
a control shaft, which is to be coupled to the link mechanism for an internal combustion engine, and is configured to change a posture of the link mechanism through rotation;
a housing including a bearing portion configured to rotatably support the control shaft;
a drive motor configured to rotationally drive an output shaft;
a wave gear type speed reducer configured to reduce a rotation speed of the output shaft, and to transmit the reduced rotation speed to the control shaft; and
a restricting mechanism, which is provided to one of the control shaft and the housing, and is configured to restrict movement of the control shaft toward a wave gear type speed reducer side in an axial direction by being brought into contact with another of the control shaft and the housing,
wherein the control shaft includes an arm to be coupled to the link mechanism,
wherein the housing has a recessed portion that is capable of accommodating the arm,
wherein the bearing portion includes
a first bearing portion provided on another end side in a rotation axis direction of the control shaft with respect to the recessed portion of the housing; and
a second bearing portion provided on one end side in the rotation axis direction of the control shaft with respect to the recessed portion of the housing, and
wherein the restricting mechanism is provided on the another end side in the rotation axis direction of the control shaft with respect to the first bearing portion.

2. An actuator for a link mechanism for an internal combustion engine according to claim 1, wherein the housing has an opening that is opened on the another ether end side in the rotation axis direction of the control shaft with respect to the first bearing portion, wherein the housing further includes a cover configured to close the opening, and wherein the restricting mechanism is provided in the opening.

3. An actuator for a link mechanism for an internal combustion engine according to claim 2, wherein the control shaft includes a detectable portion on the another end side in the axial direction of the control shaft with respect to the restricting mechanism, wherein the housing includes a detecting portion configured to detect a rotation angle of the detectable portion, and wherein the restricting mechanism is separated from the detectable portion.

4. An actuator for a link mechanism for an internal combustion engine according to claim 3, wherein the housing includes:
  a bearing feed oil passage configured to communicate between the bearing portion and an oil passage of the internal combustion engine; and
  a sensor chamber in which the detectable detected portion is arranged, and wherein the restricting mechanism is opposed to a detecting portion side of the bearing portion in the axial direction.

5. An actuator for a link mechanism for an internal combustion engine according to claim 2, wherein the restricting mechanism includes:
  a restricting surface formed on an outer periphery of the control shaft and oriented to the one end side in the rotation axis direction of the control shaft; and
  an abutment member formed on the housing and held in abutment against the restricting surface.

6. An actuator for a link mechanism for an internal combustion engine according to claim 1, wherein the restricting mechanism includes:
  an annular member press-fitted to an outer periphery of the control shaft; and
  an opposing surface formed on the housing so as to be opposed to a bearing side of the annular member in the axial direction.

7. An actuator for a link mechanism for an internal combustion engine according to claim 6, wherein the control shaft includes:
  a journal portion pivotably supported to the first bearing portion;
  a medium-diameter portion being formed on another end side of the journal portion in the axial direction and having a diameter smaller than a diameter of the journal portion; and
  a small-diameter portion being formed on another end side of the medium-diameter portion in the axial direction and having a diameter smaller than a diameter of the medium-diameter portion, and wherein the annular member is press-fitted to the medium-diameter portion, and a detectable portion is fixed to the small-diameter portion.

8. An actuator for a link mechanism for an internal combustion engine according to claim 1, wherein the control shaft has an inner hole extended in the axial direction, and wherein the actuator includes a sealing member configured to seal a detecting portion side of the inner hole in the axial direction.

9. An actuator for a link mechanism for an internal combustion engine according to claim 8, wherein the sealing member is press-fitted on the another end side in the rotation axis direction of the control shaft with respect to the journal portion.

10. An actuator for a link mechanism for an internal combustion engine according to claim 9, wherein the control shaft includes a detectable portion on the another end side in the axial direction of the control shaft with respect to the restricting mechanism, wherein the housing includes a detecting portion configured to detect a rotation angle of the detectable portion, and wherein the sealing member is formed into a cylindrical shape, and is press-fitted to an inner periphery side of the detectable portion.

11. An actuator for a link mechanism for an internal combustion engine according to claim 1, wherein the restricting mechanism includes:
  a restricting surface formed on an outer periphery of the control shaft and oriented toward the one end side in the rotation axis direction of the control shaft; and
  an abutment member formed on the housing and held in abutment against the restricting surface.

12. An actuator for a link mechanism for an internal combustion engine according to claim 11, wherein the restricting surface is a side surface on the another end side in the axial direction of the control shaft in an annular groove formed in the outer periphery of the control shaft, and wherein the abutment member is a plate-like member engageable with the annular groove and is fixed to the housing.

13. An actuator for a link mechanism for an internal combustion engine according to claim 12, wherein the abutment member is fixed to an opening of the housing with bolts.

14. An actuator for a link mechanism for an internal combustion engine, the actuator comprising:
  a control shaft, which is to be coupled to the link mechanism configured to variably change a compression ratio of an internal engine, and is configured to change the compression ratio of an internal combustion engine by changing a posture of the link mechanism through rotation;
  a housing including a bearing portion configured to rotatably support the control shaft;
  a drive motor configured to rotationally drive an output shaft;
  a wave gear type speed reducer configured to reduce a rotation speed of the output shaft, and to transmit the reduced rotation speed to one end side of the control shaft; and
  a restricting mechanism provided between the control shaft and the housing, and configured to restrict movement of the control shaft toward the wave gear type speed reducer side in an axial direction, wherein the control shaft includes a detectable portion on another end side in the axial direction of the control shaft with respect to the bearing portion, wherein the housing includes a detecting portion configured to detect a rotation angle of the detectable portion, wherein the restricting mechanism is separated from the detectable portion in the axial direction of the control shaft, wherein the housing includes:
- a bearing feed oil passage configured to communicate between the bearing portion and an oil passage of the internal combustion engine; and
- a sensor chamber in which the detectable portion is arranged, and wherein the restricting mechanism is opposed to a detecting portion side of the bearing portion in the axial direction.

\* \* \* \* \*